(12) United States Patent
Drysdale

(10) Patent No.: US 7,318,722 B2
(45) Date of Patent: Jan. 15, 2008

(54) MOLDED ARTICLE CONVEYANCE APPARATUS

(75) Inventor: Barrie Lloyd Drysdale, Puslinch (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 387 days.

(21) Appl. No.: 11/136,068

(22) Filed: May 24, 2005

(65) Prior Publication Data

US 2006/0269648 A1 Nov. 30, 2006

(51) Int. Cl.
*B29C 49/42* (2006.01)
*B29C 31/08* (2006.01)
*B65G 47/68* (2006.01)

(52) U.S. Cl. .................. 425/534; 198/363; 198/369.5; 198/444; 198/454; 198/601

(58) Field of Classification Search ................ 198/363, 198/369.1, 369.5, 448, 452, 454, 601, 444, 198/369.2; 425/534
See application file for complete search history.

(56) References Cited

U.S. PATENT DOCUMENTS

| | | | | | |
|---|---|---|---|---|---|
| 3,244,267 | A | * | 4/1966 | Berta | 198/448 |
| 3,366,220 | A | * | 1/1968 | Hebel | 198/448 |
| 4,265,356 | A | * | 5/1981 | Glover | 198/444 |
| 4,313,720 | A | * | 2/1982 | Spurr | 425/526 |
| 4,354,813 | A | | 10/1982 | Collombin | |
| 4,434,583 | A | * | 3/1984 | Burgess, Jr. | 451/242 |
| 4,938,636 | A | * | 7/1990 | Aidlin et al. | 406/31 |
| 5,161,665 | A | * | 11/1992 | Cragun | 198/448 |
| 5,186,307 | A | | 2/1993 | Doudement et al. | |
| 5,501,552 | A | * | 3/1996 | Simkowski | 406/52 |
| 5,607,706 | A | | 3/1997 | Ingram | |
| 5,772,000 | A | * | 6/1998 | Serres | 198/369.5 |
| 5,834,038 | A | | 11/1998 | Ogihara | |
| 5,944,165 | A | * | 8/1999 | Mannlein et al. | 198/442 |
| 6,620,352 | B1 | * | 9/2003 | Davis et al. | 264/40.4 |
| 2003/0091681 | A1 | | 5/2003 | Drysdale et al. | |
| 2005/0048159 | A1 | | 3/2005 | Hirasawatsu et al. | |

FOREIGN PATENT DOCUMENTS

| | | | |
|---|---|---|---|
| GB | 1489636 A | * | 10/1977 |
| WO | WO 00/61350 | | 10/2000 |

* cited by examiner

*Primary Examiner*—Robert B. Davis

(57) ABSTRACT

Disclosed is a molded article conveyance apparatus (MACA) configured to convey a plurality of molded articles away a molding machine. The MACA includes a collection of row-dedicated queuing conveyors, wherein each row-dedicated queuing conveyor is configured to convey a portion of the plurality of molded articles away from the molding machine. The MACA also includes a sequential shunting conveyor configured to selectively move from one row-dedicated conveyor to another. The sequential shunting conveyor is also configured to receive and convey molded articles away from successively selected row-dedicated queuing conveyors.

22 Claims, 7 Drawing Sheets

MOLDED ARTICLE CONVEYANCE APPARATUS

FIELD OF THE INVENTION

The present invention generally relates to molding machines, and more specifically, the present invention relates to a molded article conveyance apparatus configured for molding machines.

BACKGROUND

Known molded article conveyor apparatus are used to transport molded articles away from complementary mold halves of a molding machine. These known apparatus impart conveyor-system process-related defects onto the molded articles. Some defects are classified as "functional" in that a functionally defective molded article no longer functions as originally intended (that is, the molded article is broken). Other defects are classified as "cosmetic" in that a cosmetically defective molded article may function successfully but lacks cosmetic appeal. Maintaining cosmetic appeal of the molded articles enhances and registers a favorable impression with consumers.

PCT Patent Application WO 00/61350 (Titled: Method and Apparatus for Handling Parts Ejected from an Injection Molding Machine; Priority Filing Date: 14 Apr. 1999; International Filing Date: 19 Oct. 2000), hereinafter referred to as the '61350, discloses a molded article conveying apparatus. Based on FIGS. 2, 3, 4, 5 and 6 of the '61350, a conveying apparatus imposes, onto the molded articles, process-related defects such as blemishes and/or abrasions as a result of inadvertently scuffing, scratching and/or scraping the articles against other adjacently moving articles and/or by rough handling of the articles. While the scuffed articles may be functionally usable, they will lack cosmetic appeal.

U.S. patent application Ser. No. 2005/0048159 A1 (Titled: Preform Conveying Device; Priority Filing Date: 28 Jan. 2002), hereinafter referred to as the '48159, discloses a preform conveying apparatus. A preform is a molded article which is made by an injection molding machine and then later blown by a blow molding machine into a water bottle for example. FIG. 4 of the '48159, shows a portion of the conveying apparatus that has a mandrel or pin which engages an inner surface of a neck or threaded region of the preform. To keep the preform from falling off the mandrel, the mandrel will need to be sized somewhat larger than the inner diameter of the neck of the preform. This engagement disadvantageously imparts warping defects into and/or onto the threads disposed on the neck area of the preform, or may fail to properly engage the preform altogether. FIG. 5 of the '48159 shows a gripping mechanism used to grip a flange portion that extends away from the neck of the preform. To keep the preform from inadvertently disengaging from the gripping mechanism and falling onto the floor, the gripping mechanism must impart a substantial gripping force onto the flange of the preform. This gripping engagement may disadvantageously impart warping defects into and/or onto the flange portion of the preform.

By using these known molded article conveying apparatus, manufacturers of the molded articles are faced with either scrapping the scuffed molded articles or selling them at a substantial discount. Disadvantageously, manufacturing costs will increase and/or consumers will develop a poor perception of quality of the molded article based upon its scuffed appearance.

SUMMARY

According to an aspect of the present invention, there is provided a molded article conveyance apparatus configured to convey a plurality of molded articles away a molding machine, including a collection of row-dedicated queuing conveyors, wherein each row-dedicated queuing conveyor is configured to convey a portion of the plurality of molded articles away from the molding machine, and a sequential shunting conveyor configured to selectively move from one row-dedicated conveyor to another, and to receive and convey molded articles away from successively selected row-dedicated queuing conveyors.

According to another aspect of the present invention, there is provided a molding machine configured to mold a plurality of molded articles, including a molded article conveyance apparatus configured to convey the plurality of molded articles away the molding machine, including a collection of row-dedicated queuing conveyors, wherein each row-dedicated queuing conveyor is configured to convey a portion of the plurality of molded articles away from the molding machine, and a sequential shunting conveyor configured to selectively move from one row-dedicated conveyor to another, and to receive and convey molded articles away from successively selected row-dedicated queuing conveyors.

A technical effect realized by the first and the second aspects of the present invention is that the molded article conveyance apparatus does not move from side to side so that the effective floor space taken up by the molded article conveyance apparatus does not negatively impact on other equipment.

BRIEF DESCRIPTION OF THE FIGURES

Exemplary embodiments of the present invention will be described with reference to the following Figures and the detailed description, in which.

DETAILED DESCRIPTION OF THE EXEMPLARY EMBODIMENTS

Figure 1:
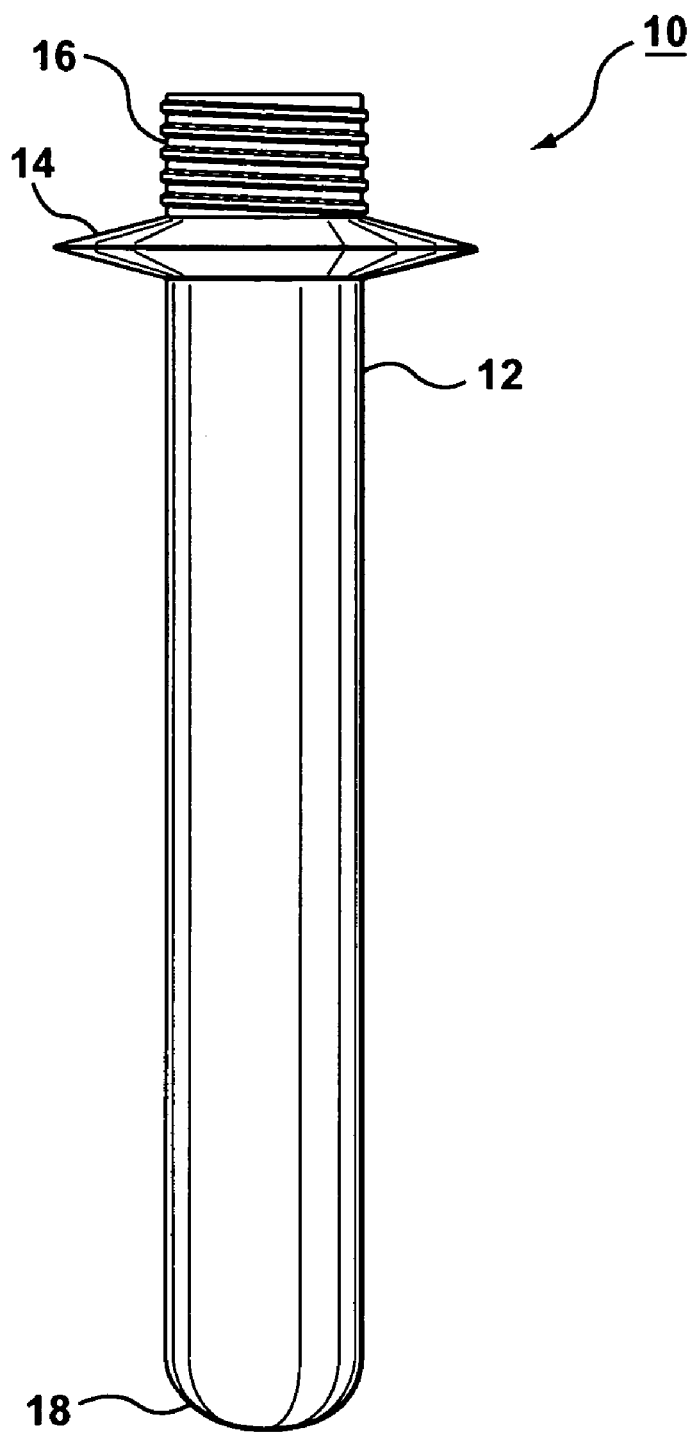
FIG. 1 is a frontal view of a molded article.

FIG. 1 is the frontal view of the molded article 10. The molded article 10 is a preform which is sometimes called a parison. Generally, the preform is a formed intermediate part which is then reformed into a final part such as a blown plastic water bottle for example. The preform is a solidified hollow tube of plastic which was made by injecting hot melt into a mold assembly. The molded article 10 includes a body 12, a threaded open end 16 (also called a neck portion), a closed end 18, and a flange 14 that extends outwardly from and surrounds the body 12. The flange 14 is located between the threaded open end 16 and the closed end 18. The flange 14 is also called a support ledge. The closed end 18 is also be called a tail end or gate end.

Figure 2:
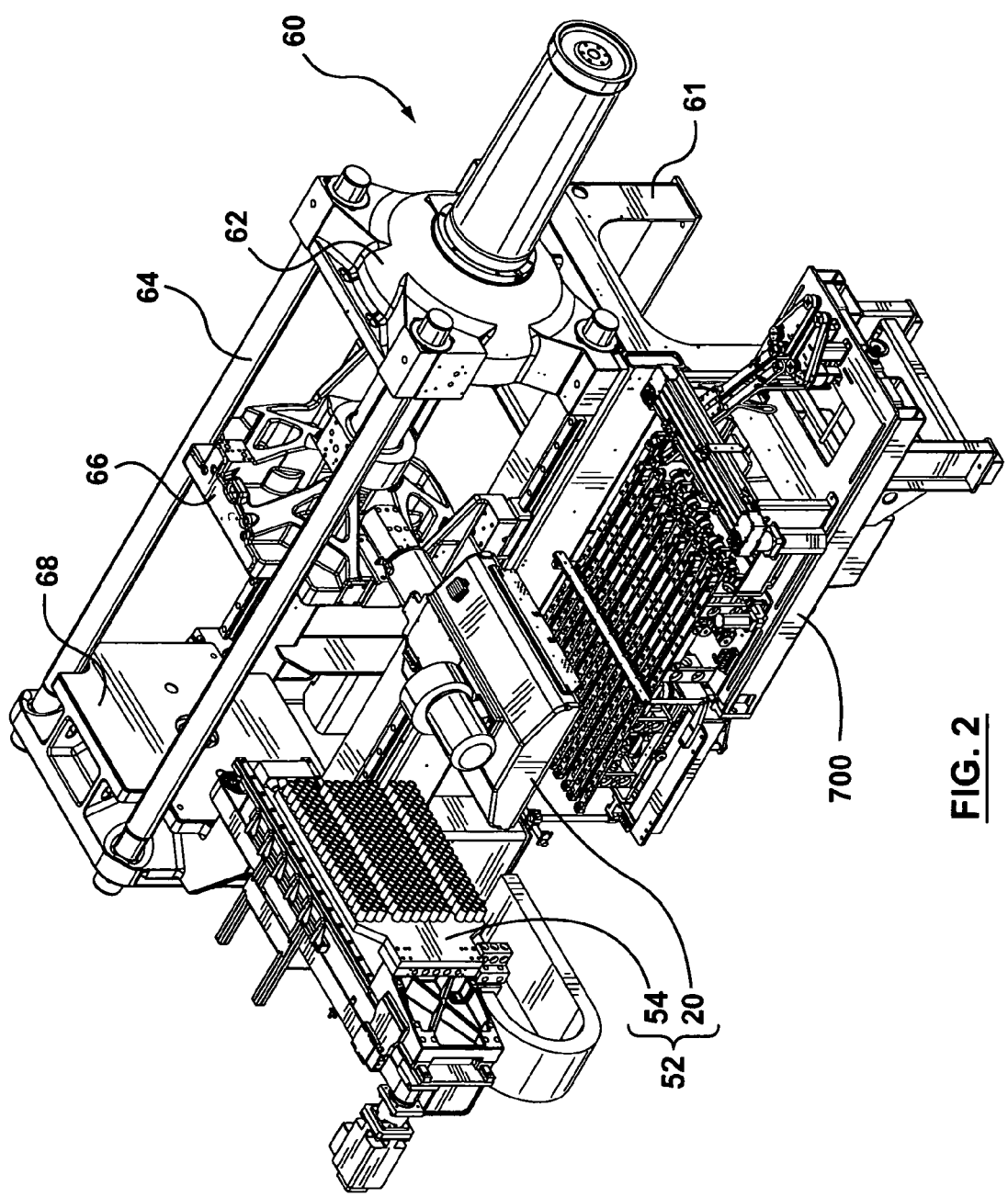
FIG. 2 is a perspective view of a molded article conveyance apparatus (MACA) configured to move the molded article of FIG. 1 for a molding machine.

FIG. 2 is the perspective view of the molded article conveyance apparatus (MACA) 700 configured to convey the molded article of FIG. 1 for the molding machine 60. Generally, the MACA 700 may also be configured to convey other types and/or shapes of molded articles.

The molding machine 60 includes a base assembly 61. Attached to the base assembly 61 is a stationary platen 68, a movable platen 66, a clamping assembly 62 and tie bars 64. The bars 64 maintain the clamping assembly 62 in an operative orientation relative to the platens 66, 68. Attached to the stationary platen 68 and attached to the movable platen 66 is a stationary mold half (not depicted) and a movable mold half (not depicted) respectively. The stationary mold half and the movable mold half are also called complementary mold halves. The mold halves mold articles such as the article 10 depicted in FIG. 1 for example. Specifically, the mold halves mold a matrix of molded articles that are arranged in rows and columns within the matrix. The clamping assembly 62 moves the movable platen 66 relative to the stationary platen 68 so that the mold halves move between a mold opened position and a mold closed position. Positioned behind the stationary platen 68 is a melt processing and injecting assembly (not depicted) that includes a melt processing screw disposed in a barrel having a hopper attached to the barrel. The machine 60 also includes a transfer assembly 52 that moves the matrix of molded articles away from the complementary mold halves once the molded articles have been molded.

The transfer assembly 52 includes a combination of cooperating sub-assemblies, which are a material handling sub-assembly 54 and a material picking sub-assembly 20.

The material handling sub-assembly 54 receives the matrix of the molded articles from one of the mold halves, and moves the matrix from an in-mold position to an out-mold position relative to the mold halves. The material handling sub-assembly 54 reciprocates along a direction that is perpendicular to an axis that extends between the platens 66, 68. The matrix of molded articles is depicted as being held by the assembly 54 that is placed in the out-mold position.

The material picking sub-assembly 20 transfers the molded articles away from the material handling sub-assembly 54 over to the MACA 700. The sub-assembly 20 includes mechanisms configured to receive and hold the matrix of molded articles. The material picking assembly 20 cooperates with the base assembly 61 by sliding towards the sub-assembly 54 and then picking up the matrix of molded articles from the sub-assembly 54, and then sliding back and rotating to face the molded articles towards the MACA 700.

In an alternative, the portion of the MACA 700 does not move relative to the MACA 700 but the sub-assembly 20 moves downwardly to meet the portion of the MACA 700 and releases the matrix of molded articles onto the MACA 700. In general, the sub-assembly 20 and the MACA 700 move relative to each other to meet so that the matrix of molded articles may be transferred from the sub-assembly 20 over to the MACA 700.

The technical effect of the MACA 700 is that the MACA 700 substantially refrains from imparting conveyor-assembly process-related defects onto the molded articles so that the articles may substantially retain their cosmetic appeal. Another technical effect is that the MACA 700 does not move from side to side of the sub-assembly 20 so that the effective floor space taken up by the MACA 700 remains substantially the same width as the width of the sub-assembly 20, and this permits more equipment to be installed onto the factory floor space.

Figure 3:
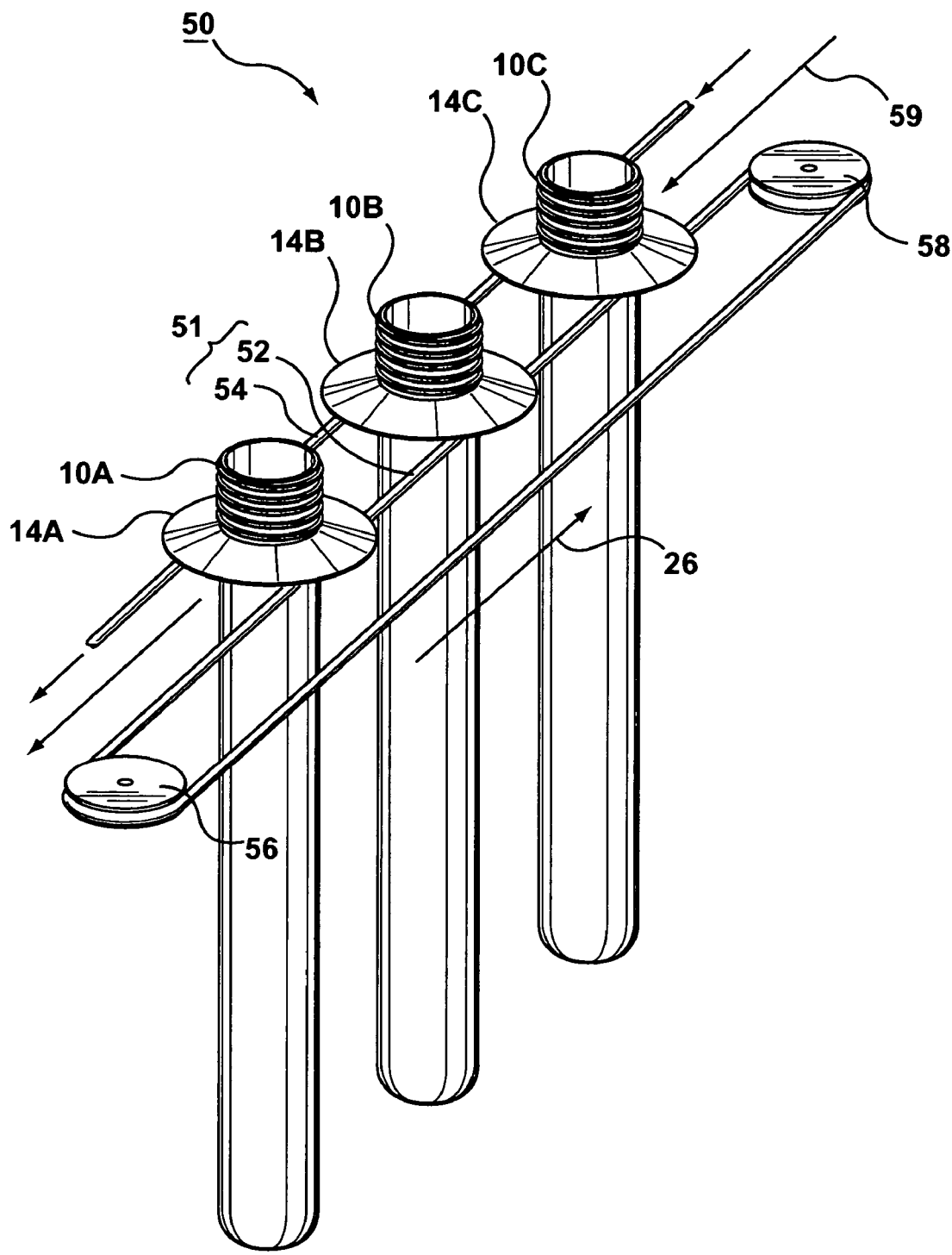
FIG. 3 is a perspective view of a belt assembly incorporated in the MACA of FIG. 2.

FIG. 3 is the perspective view of the belt sub-assembly 50 incorporated into the sub-assemblies of the MACA 700 of FIG. 2. The belt sub-assembly 50 includes a conveyor belt system 51. The belt system 51 includes a first belt 52 and a second belt 54. The first belt 52 is an endless belt that winds around a set of wheels 56, 58 that are space apart from each other. The wheel 56 is connected to a motor (not depicted) that causes the belt 52 to translate. Upon energizing the motor, the wheel 56 is turned which in turn moves the belt 52. The wheels 56 and 58 are connected to a frame (not depicted). Another set of wheels (not depicted) is also connected to the belt 54. The same motor that drives the wheel 56 also drives the other wheel connected to the belt 54 so that the belts 52, 54 can be moved synchronously. This arrangement prevents molded articles 10A, 10B and 10C from being rotated as they are conveyed by the belts 52, 54. When the belts 52, 54 are driven, they move a row of molded articles 10A, 10B and 10C along a molded article travel path 59. Portions of the flanges 14A, 14B and 14C of respective molded articles 10A, 10B and 10C are received by and rest on a conveyance surface of the belts 52, 54 so that the molded articles 10A, 10B and 10C remain offset from one another as they are conveyed by the belts 52, 54. The belts 52, 54 may be O-ring types belts, but other belt shapes may be used as well (such as belts having a square-shaped cross-sectional area, etc). The belts 52, 54 receive the molded articles 10A, 10B and 10C in a predetermined orientation, such as having the neck portions face upwardly and offset from each other.

The belt sub-assembly 50 conveys the molded articles 10A, 10B and 10C in a substantially scuff-free contact arrangement relative to other molded articles being conveyed. The belt sub-assembly 50 engages the molded articles 10A, 10B and 10C in a substantially non-blemished and/or non-scuffed arrangement relative to adjacently moving articles and/or structural components of the MACA 700. A non-scuffed arrangement means the molded articles 10A, 10B and 10C are moved so that they remain substantially free from blemishes, abrasions, or scratches which may be caused by inadvertently scraping the molded articles 10A, 10B and 10C in an interference motion relative with adjacently or neighborly moving molded articles. Non-blemished arrangement means the molded articles 10A, 10B and 10C are substantially free from blemishing marks or disfiguring marks caused by inadvertently contacting the molded articles 10A, 10B and 10C relative to the structures of the MACA 700.

A technical effect provided by the belt sub-assembly 50 is that the molded articles 10A, 10B and 10C may be moved scuff-free and/or blemish-free so that the articles 10A, 10B and 10C retain their cosmetic appeal. Manufacturers of the molded article could then avoid scraping and/or scuffing molded articles and/or selling them at a substantial discount, and consequently manufacturing costs could be reduced and consumer confidence in the articles could increase based on the cosmetic appeal retained by the articles.

Figure 4:
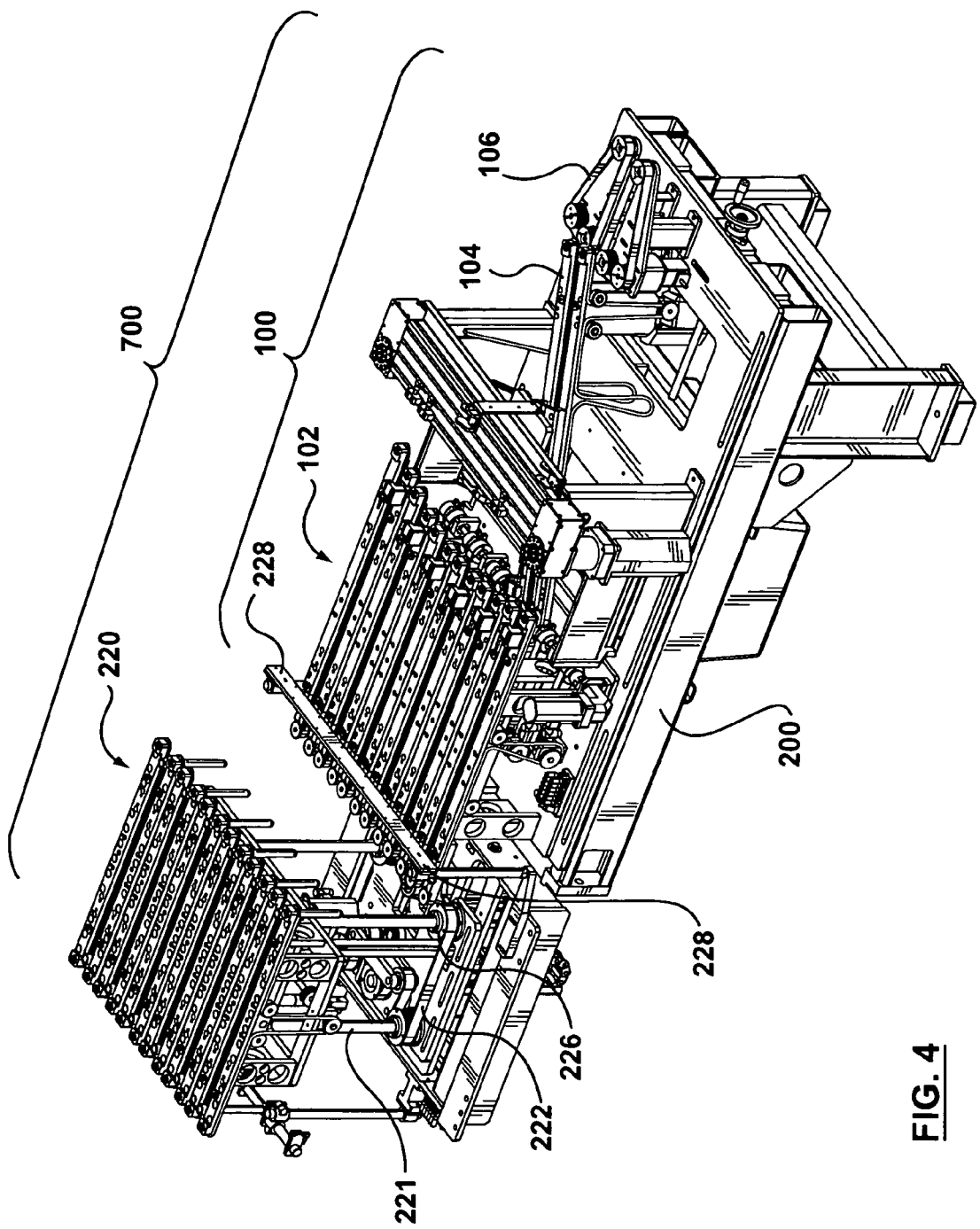
FIG. 4 is a close-up perspective view of the MACA of FIG. 2.

FIG. 4 is a close-up perspective view of the MACA of FIG. 2. The MACA 700 includes a cooperating combination of sub-assemblies which are a consolidating conveyor sub-assembly 100 and a receiving conveyor sub-assembly 220. Each of sub-assemblies 100, 220 includes the belt sub-assembly 50 of FIG. 3.

The receiving conveyor sub-assembly 220 includes a collection of row-dedicated queuing conveyors that all move in unison towards and away from the sub-assembly 20 of FIG. 2. Each row-dedicated queuing conveyor receives a corresponding row of molded articles from sub-assembly 20. After receiving the rows of molded articles, each row-dedicated queuing conveyor moves the row of molded articles, en masse (as a group), over to the sub-assembly 100. Once the sub-assembly 220 has been emptied, the sub-assembly 220 is ready to receive another matrix of molded articles from the sub-assembly 20. The sub-assembly 220 includes a motor (not depicted) for driving a belt 222 around a collection of actuators 226 which, in turn, slide posts 221 towards and away from the sub-assembly 20. The collection of row-dedicated queuing conveyors are attached to the distal ends of the posts 221. As the posts 221 are moved, they translate or move the conveyors of sub-assembly 220 off-line (along a vertical direction) from the MACA 700 and towards the sub-assembly 20, and then translate or move the conveyors of sub-assembly 220 back in-line (along the same vertical direction) with the MACA 700.

The consolidating sub-assembly 100 includes a collection of row-dedicated queuing conveyors 102, a shunting conveyor 104 and an auxiliary conveyor assembly 106.

The belts of each conveyor of the sub-assembly 220 are activated in synchronization with the belts of the collection of conveyors 102 so that the molded articles, which are conveyed along the travel path along the sub-assembly 110 and the collection of conveyors 102, move continuously from the sub-assembly 220 over to the collection of conveyors 102 when so activated. Coordination and control of operating the belts in combination is performed so that the spacing between the molded articles can be maintained as they are conveyed.

Each conveyor of the collection of queuing conveyors 102 receives a row of articles from a corresponding conveyor of the sub-assembly 220. Once the sub-assembly 220 has been emptied, it is ready to receive more rows of molded articles from the assembly 20. The conveyors 102 each receive a respective row of molded articles from the set of row-dedicated queuing conveyors associated with sub-assembly 220 and then pass on the molded articles over to the sequential shunting conveyor 104 as will be explained further below. The conveyor 104 then moves the articles over to the auxiliary conveyor assembly 106 so that the articles move along the auxiliary conveyor 106 in a single file manner. In an alternative embodiment, the assembly 106 may include two or more conveyors that move the articles along different pathways away from the sub-assembly 100.

A structure 228 presents a stripe of reflective material that is used with a photo-detecting sensor (not depicted). In combination, the reflective material and the sensor are used to detect molded articles that may be present on the sub-assembly 220. A data processing system connected to the sensor is used to prevent the sub-assembly 220 from moving off-line from the MACA 700 until all molded articles contained in the sub-assembly 220 have been conveyed therefrom.

Figure 5:
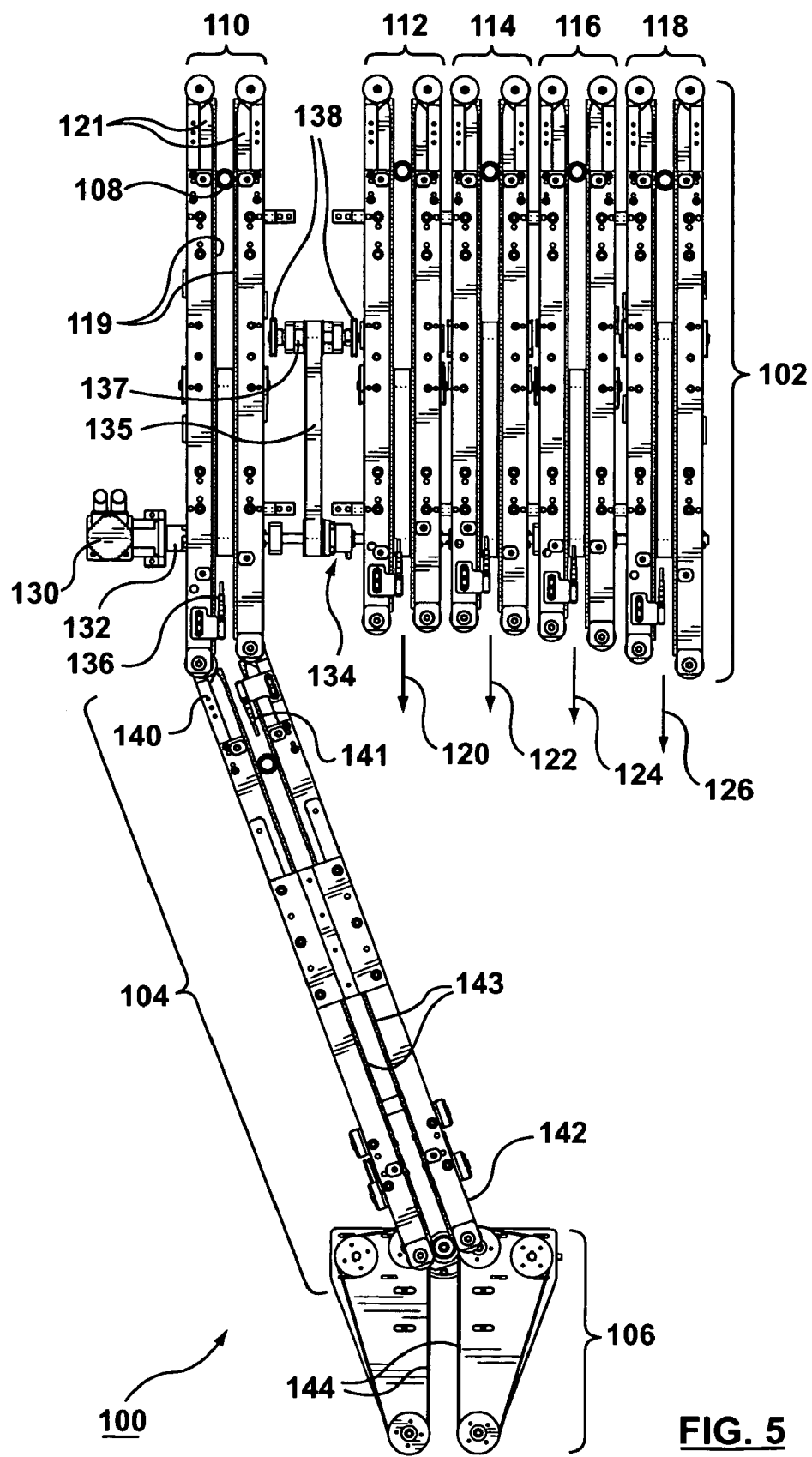
FIG. 5 is a top view of a portion of the MACA of FIG. 4.

FIG. 5 is the top view of a portion of the MACA 700 of FIG. 4. The sub-assembly 100 marshals or consolidates multiple rows of molded articles contained in a collection of conveyors onto a single output conveyor, such as the auxiliary conveyor 106. The sub-assembly 100 includes a collection of row-dedicated queuing conveyors 102, a sequential shunting conveyor 104 and an auxiliary conveyor 106. Each of the conveyors 102, conveyor 104 and conveyor 106 include the sub-assembly 50 of FIG. 3.

The collection of row-dedicated queuing conveyors 102 each receive and convey a corresponding row of molded articles from corresponding conveyors of the receiving conveyor sub-assembly 220. In an alternative embodiment, the MACA 700 does not include the sub-assembly 220 and the collection of conveyors 102 is adapted so that each row-dedicated queuing conveyor of the collection 102 receives and moves a corresponding row of molded articles from the sub-assembly 20.

The sequential shunting conveyor 104 has an input end 140 and has an output end 142. The conveyor 104 selectively and sequentially pivots the input end 140 from one row-dedicated conveyor (such as any one of conveyors 110, 112, 114, 116, 118) to another row-dedicated conveyor. The conveyor 104 selectively receives a corresponding row of molded articles from successively selected row-dedicated queuing conveyors belonging to the collection 102, and then moves each received corresponding row of molded articles from the input end 140 to the output end 142 and then onto the auxiliary conveyor 106. The conveyor 104 includes a pair of belts 143 that are similar to the conveyor 50 of FIG. 3.

The auxiliary conveyor 106 receives the molded articles from the sequential shunting conveyor 104. In an alternative embodiment, the sub-assembly 100 does not include the conveyor 106, and the conveyor 104 is then interfaced to an existing output or auxiliary conveyor which is not provided with the MACA 700.

The collection of conveyors 102 includes queuing conveyors 110, 112, 114, 116 and 118 each of which have belts that engage a portion of the molded articles (such as the flange portion of a preform for example). Each conveyor 110, 112, 114, 116 and 118 includes a pair of frames that each have a respective conveyor belt 119 mounted to a respective pair of conveyor frames 121 which are similar to the belt conveyor 50. A molded article 108 is shown with a portion of its flange resting on and engaging with the conveyor belts 119. Each queuing conveyor 112, 114, 116 and 118 defines a respective molded article travel path 120 to 126.

The conveyor between conveyor 110 and 112 was removed to show the mechanisms used to drive the belts associated with each conveyor 110 to 118. A belt driving mechanism 130 rotates a shaft 132. The shaft 132 extends from the mechanism 130 and underneath each conveyor 110 to 118. Each queuing conveyor 110, 112, 114, 116 and 118 is controlled by a dedicated selectively-activated clutch mechanism. For example, the conveyor that is normally placed between conveyors 110 and 112 is controlled by clutch mechanism 134 that is activated by a data processing system (not depicted) that responds to a sensor 136 that sense presence of the molded articles on the queuing conveyor 110. The sensor 136 is a photodiode working in combination with reflective tape placed at an opposite end of the conveyor 110 so that the sensor 136 may detect the presence of molded article in a travel path of the conveyor 110. Once the clutch mechanism 134 is activated, it drives a belt 135 which then activates a gearing mechanism 137 attached to wheels 138 which then turn the belts (similar to belts 119) used on the conveyor to move the molded articles.

The sequential shunting conveyor 104 includes the belt sub-assembly 50 of FIG. 3. The input end 140 of the conveyor 104 is pivotally moved between or successively shunted between each conveyor of the collection 102. For example, once the input end 140 is aligned with a selected queuing conveyor 110, the clutch mechanism of queuing conveyor 110 is activated so that the conveyor 110 moves its molded articles over onto the conveyor 104. Once the conveyor 110 is emptied, the sensor 136 provides a signal to the data processing system which then issues a signal to disengage the clutch mechanism associated with the conveyor 110. The conveyor 104 receives the molded articles from the conveyor 110 and then moves the articles over to the consolidated conveyor 106. A sensor 141 is used to detect the presence of molded articles on the conveyor 104. Once data processing system receives a signal from the sensor 141 that senses the conveyor 104 is emptied, the input end 140 of the conveyor 104 is then shunted (swung, pivoted) over to conveyor 112, and the process is then repeated for each successive conveyor of the collection of conveyors 102.

The belts 143 are activated in synchronization with the belts 119 so that the molded articles, which are conveyed along the travel path along the conveyors 110 and 104, move continuously from the conveyor 110 to the conveyor 104 when so activated. The belts 119 are activated in synchronization with the belts 144 to unload conveyor 104 onto the conveyor 106 when so activated. Coordination and control of operating the belts in combination is performed so that the spacing between the molded articles can be maintained as they are conveyed.

The conveyor 106 also includes a sensor (not depicted) that senses whether there are molded articles that, for whatever reason, are not moving away along the conveyor 106. If the data processing system receives a signal from this sensor, the data processing system may respond by halting the operation of the collection of conveyors 102, the conveyors 220 of FIG. 4 and the conveyor 106 so that an operator may attend to determining and resolving the problem and then restarting operation of the MACA 700. The conveyor 106 includes a pair of belts 144 that are similar to the conveyor 50 of FIG. 3.

Figure 6:
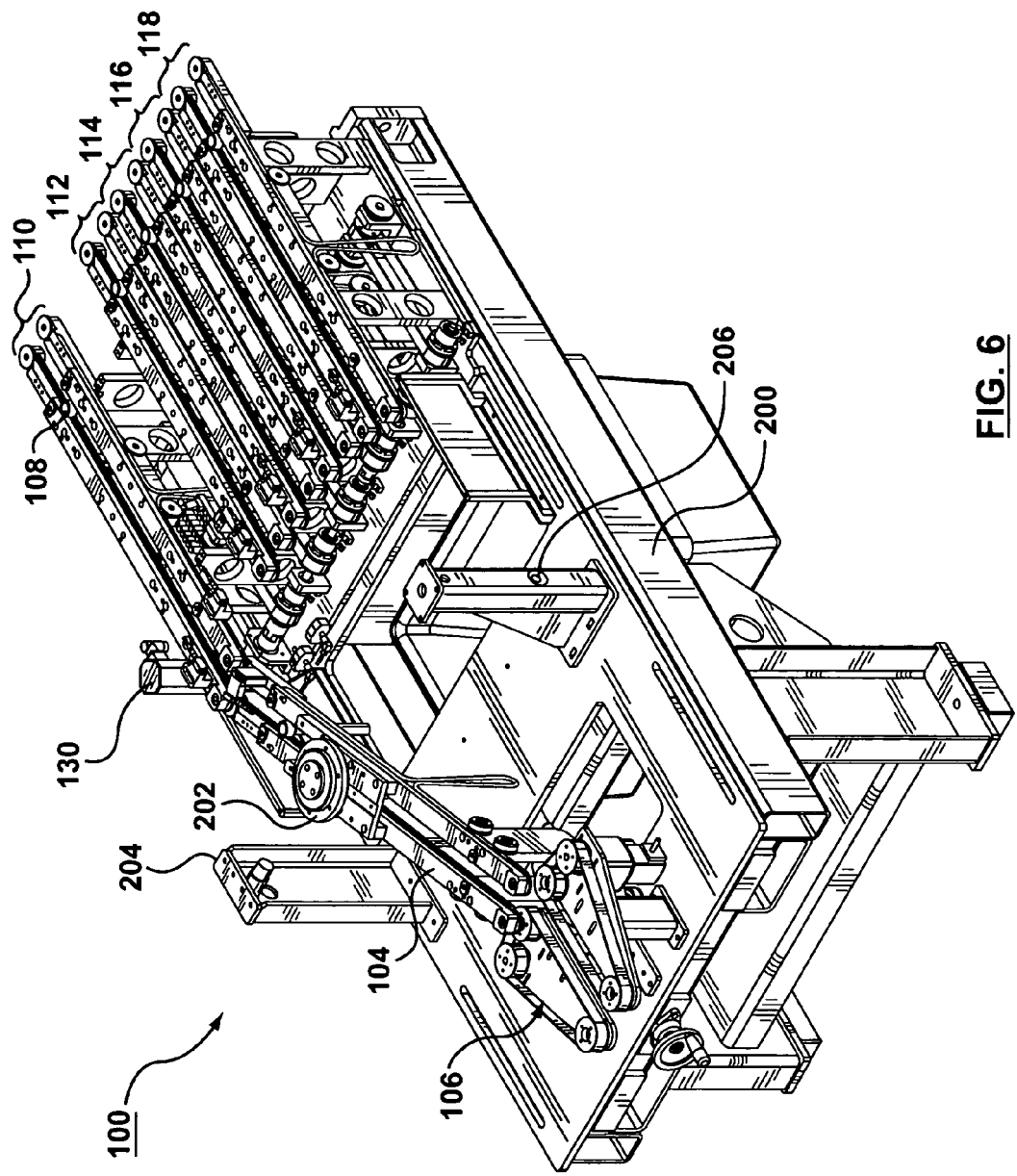
FIG. 6 is a perspective view of a portion of the MACA of FIG. 2.

FIG. 6 is the perspective view of the portion of the MACA 700 of FIG. 2. The shunting mechanism that moves the input end 140 of the conveyor 104 includes a rotary bearing mechanism 202 that is connected to a top side of the conveyor 104 at a location that is approximately midway between the input end 140 and the output end 142 of the conveyor 104. Alternatively, the mechanism 202 may be connected underneath the conveyor 104. A frame 200 is used to support the sub-assembly 100. Extending up from the frame 200 are posts 204 and 206. The shuttling mechanism extends across the posts 204 and 206.

Figure 7:
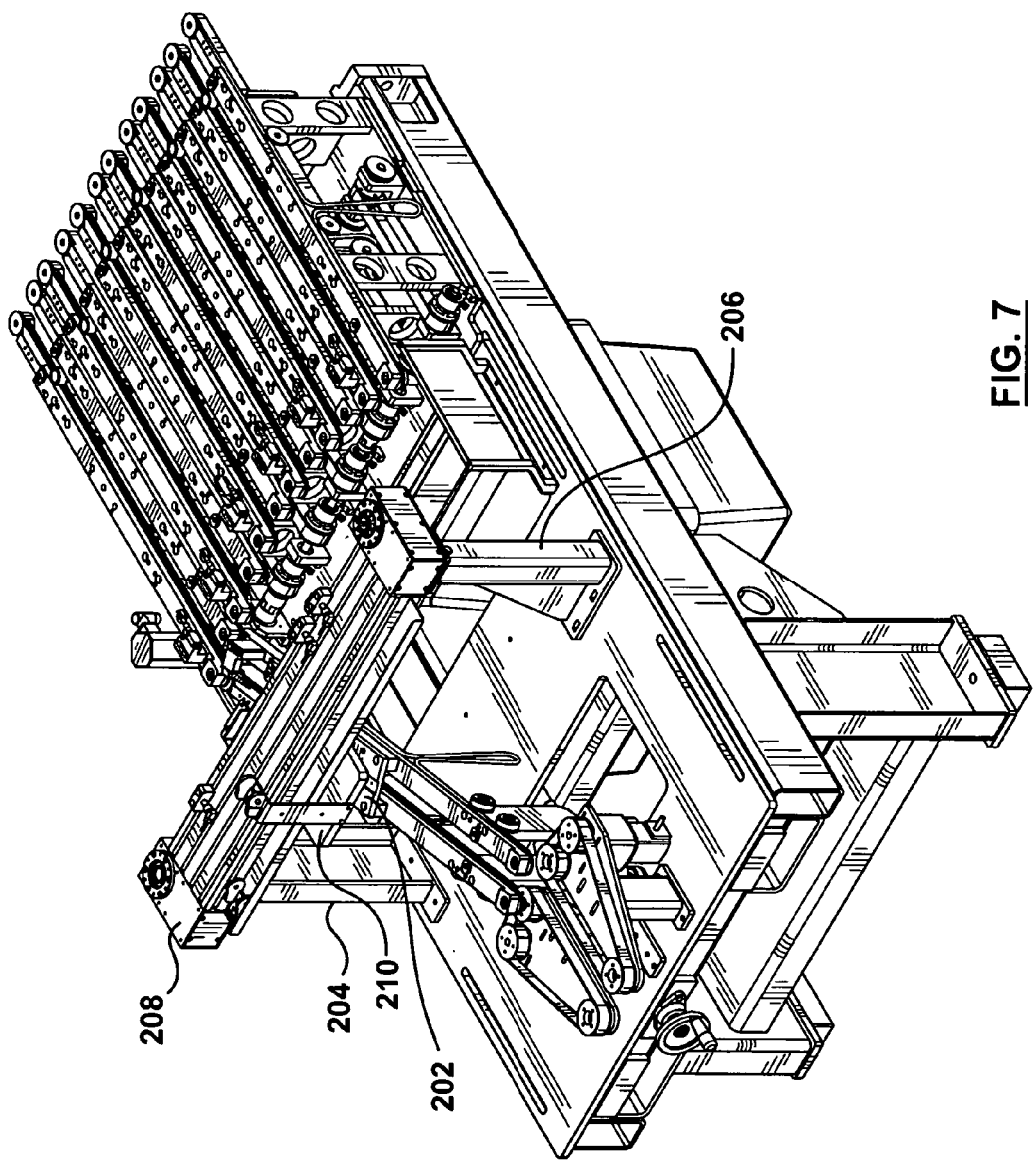
FIG. 7 is another perspective view of the portion of the MACA of FIG. 6.

FIG. 7 is another perspective view of the portion of the MACA 700 of FIG. 6. The shuttling mechanism also includes a railing assembly 208. The railing assembly 208 extends across the posts 204 and 206. The rotary bearing 202 is connected to a plate 210 which is then connected to a linear drive mechanism (not depicted) which shuttles from side to side and beneath the rail assembly 208. The motion of the linear drive mechanism is controlled and coordinated by the data processing system in response to the status of the sensors used to sense the presence of the molded articles on the collection of conveyors 102 and the conveyor 104.

It will be appreciated that some elements may be adapted for specific conditions or functions. The concepts described above may be further extended to a variety of other applications that are clearly within the scope of the present invention. Having thus described the embodiments, it will be apparent to those skilled in the art that modifications and enhancements are possible without departing from the concepts as described. Therefore, what is intended to be protected by way of letters patent should be limited only by the scope of the following claims:

The invention claimed is:

1. A molded article conveyance apparatus configured to convey a plurality of molded articles away from a molding machine, comprising:
   a collection of row-dedicated queuing conveyors, wherein each row-dedicated queuing conveyor is configured to convey a portion of the plurality of molded articles away from the molding machine; and
   a sequential shunting conveyor configured to selectively move from one row-dedicated queuing conveyor to another row-dedicated queuing conveyor, and to receive and convey molded articles away from successively selected row-dedicated queuing conveyors,
   wherein the collection of row-dedicated queuing conveyors includes:
      a first set of row-dedicated queuing conveyors each configured to receive a corresponding row of molded articles from a transfer assembly, and
      a second set of row-dedicated queuing conveyors each configured to receive a respective row of molded articles from the first set of row-dedicated queuing conveyors and to pass on the respective row of molded articles to the sequential shunting conveyor.

2. The molded article conveyance apparatus of claim 1, wherein:
   the molding machine includes:
      complementary mold halves configured to mold the plurality of molded articles; and
      the transfer assembly configured to transfer the plurality of molded articles away from the complementary mold halves; and
   the each row-dedicated queuing conveyor is configured to convey the portion of the plurality of molded articles received from the transfer assembly.

3. The molded article conveyance apparatus of claim 1, wherein:
   the sequential shunting conveyor has an input end and an output end;
   the sequential shunting conveyor conveys the molded articles from the input end to the output end;
   the output end is configured to remain substantially stationary; and
   the input end is configured to selectively move from one row-dedicated conveyor to another.

4. The molded article conveyance apparatus of claim 1, wherein:
   the plurality of molded articles is a matrix of molded articles having columns and rows of molded articles.

5. The molded article conveyance apparatus of claim 1, further comprising:
   an auxiliary conveyor configured to receive and move the molded articles from the sequential shunting conveyor.

6. The molded article conveyance apparatus of claim 5, wherein:
   the auxiliary conveyor is configured to convey the molded articles to a vision inspection system configured to visually inspect the molded articles.

7. The molded article conveyance apparatus of claim 1, wherein:
   each of the row-dedicated queuing conveyors and the sequential shunting conveyor are configured to present a conveyance surface configured to receive and to support a portion of each molded article.

8. The molded article conveyance apparatus of claim 1, wherein:
   the molded articles are preforms; and each preform has a neck portion and a support ledge adjacent to the neck portion; and each of the row-dedicated queuing conveyors and the sequential shunting conveyor are configured to present a conveyance surface configured to receive and to support a portion of the support ledge of said each preform.

9. The molded article conveyance apparatus of claim 1, wherein:

the molded articles are preforms; and each of the row-dedicated queuing conveyors and the sequential shunting conveyor are configured to move preforms oriented with the neck portion facing upwardly and offset from each other.

10. The molded article conveyance apparatus of claim 1, wherein:

each of the row-dedicated queuing conveyors and the sequential shunting conveyor are configured to substantially refrain from imparting defects onto moving molded articles, the moving molded articles retaining their cosmetic appeal.

11. The molded article conveyance apparatus of claim 2, wherein:

a portion of the collection of row-dedicated queuing conveyors is configured to:

translate off-line from the collection of row-dedicated queuing conveyors and over to the transfer assembly, and in response the transfer assembly releases the molded articles onto the portion of the collection of row-dedicated queuing conveyors; and translate away from the transfer assembly and back in-line with the collection of row-dedicated queuing conveyors.

12. A molding machine configured to mold a plurality of molded articles, comprising:

a molded article conveyance apparatus configured to convey the plurality of molded articles away from the molding machine, the molded article conveyance apparatus including:

a collection of row-dedicated queuing conveyors, wherein each row-dedicated queuing conveyor is configured to convey a portion of the plurality of molded articles away from the molding machine; and a sequential shunting conveyor configured to selectively move from one row-dedicated queuing conveyor to another row-dedicated queuing conveyor, and to receive and convey molded articles away from successively selected row-dedicated queuing conveyors, wherein the collection of row-dedicated queuing conveyors includes:

a first set of row-dedicated queuing conveyors each configured to receive a corresponding row of molded articles from a transfer assembly, and a second set of row-dedicated queuing conveyors each configured to receive a respective row of molded articles from the first set of row-dedicated queuing conveyors and to pass on the respective row of molded articles to the sequential shunting conveyor.

13. The molding machine of claim 12, further comprising:

complementary mold halves configured to mold the plurality of molded articles; and the transfer assembly configured to transfer the plurality of molded articles away from the complementary mold halves;

wherein the each row-dedicated queuing conveyor is configured to convey the portion of the plurality of molded articles received, from the transfer assembly.

14. The molding machine of claim 12, wherein:

the sequential shunting conveyor has an input end and an output end;

the sequential shunting conveyor conveys the molded articles from the input end to the output end;

the output end is configured to remain substantially stationary; and the input end is configured to selectively move from one row-dedicated conveyor to another.

15. The molding machine of claim 12, wherein:

the plurality of molded articles is a matrix of molded articles having columns and rows of molded articles.

16. The molding machine of claim 12, further comprising:

an auxiliary conveyor configured to receive and move the molded articles from the sequential shunting conveyor.

17. The molding machine of claim 16, wherein:

the auxiliary conveyor is configured to convey the molded articles to a vision inspection system configured to visually inspect the molded articles.

18. The molding machine of claim 12, wherein:

each of the row-dedicated queuing conveyors and the sequential shunting conveyor are configured to present a conveyance surface configured to receive and to support a portion of each molded article.

19. The molding machine of claim 12, wherein:

the molded articles are preforms; and each preform has a neck portion and a support ledge adjacent to the neck portion; and each of the row-dedicated queuing conveyors and the sequential shunting conveyor are configured to present a conveyance surface configured to receive and to support a portion of the support ledge of each said preform.

20. The molding machine of claim 12, wherein:

the molded articles are preforms; and each of the row-dedicated queuing conveyors and the sequential shunting conveyor are configured to move preforms oriented with the neck portion facing upwardly and offset from each other.

21. The molding machine of claim 12, wherein:

each of the row-dedicated queuing conveyors and the sequential shunting conveyor are configured to substantially refrain from imparting defects onto moving molded articles, the moving molded articles retaining their cosmetic appeal.

22. The molding machine of claim 13, wherein:

a portion of the collection of row-dedicated queuing conveyors is configured to:

translate off-line from the collection of row-dedicated queuing conveyors and over to the transfer assembly, and in response the transfer assembly releases the molded articles onto the portion of the collection of row-dedicated queuing conveyors; and translate away from the transfer assembly and back in-line with the collection of row-dedicated queuing conveyors.

* * * * *